United States Patent [19]

Tilp

[11] 3,728,517

[45] Apr. 17, 1973

[54] ELECTRIC HEATER AND MOUNTING THEREFOR

[75] Inventor: George E. Tilp, Short Hills, N.J.

[73] Assignee: Adams Industries, Inc., Union, N.J.

[22] Filed: Aug. 26, 1971

[21] Appl. No.: 175,058

[52] U.S. Cl. ................... 219/316, 219/436, 219/523
[51] Int. Cl. ............................................. H05b 1/00
[58] Field of Search ..................... 219/316, 436–442, 219/523, 538, 335, 336; 338/229, 231, 232

[56] References Cited

UNITED STATES PATENTS 3,319,048  5/1967  Wells ............................. 219/523 X
2,907,860  10/1959  Geller ............................. 219/523 X Primary Examiner—C. L. Albritton
Attorney—Harry B. Rook

[57] ABSTRACT

A cup-shaped casing has a self-sustaining insulated wire coil therein whose ends project through holes in a cap plate which closes the open end of the casing and over whose edge is die-pressed the rim of the casing to secure the cap in the casing, and a bolt passes through a hole in said cap with its head abutting the inner side of the cap and with its shank and nut coacting with a retaining cup to clamp the wall of a container between the cup and a circumferential extension bead on the casing, thereby to mount the heater in the container.

4 Claims, 4 Drawing Figures

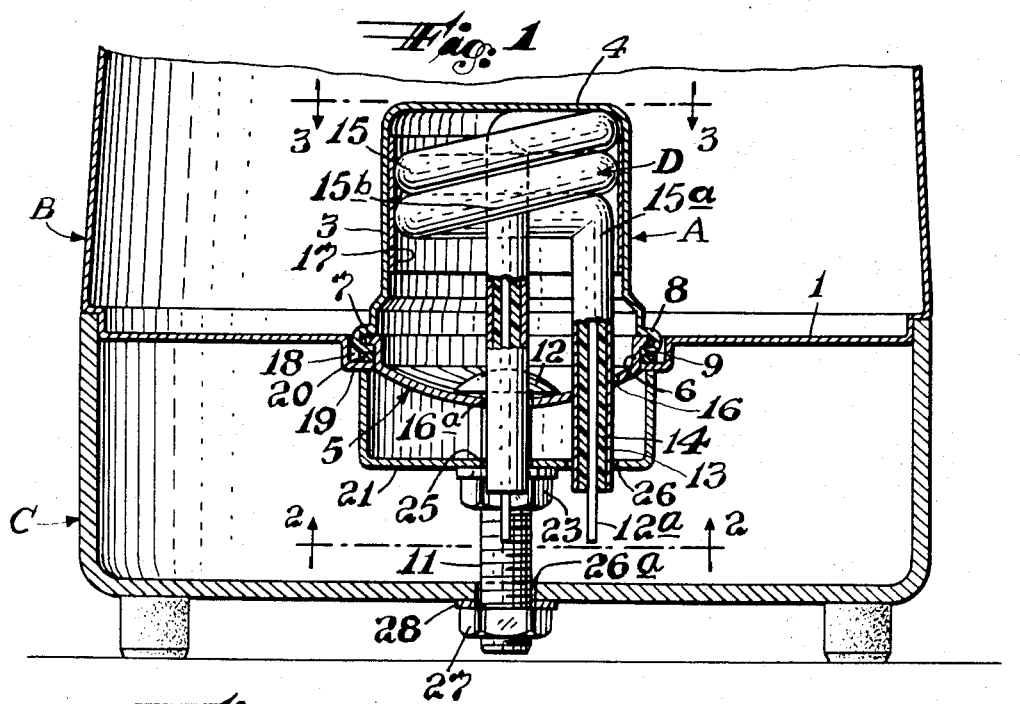
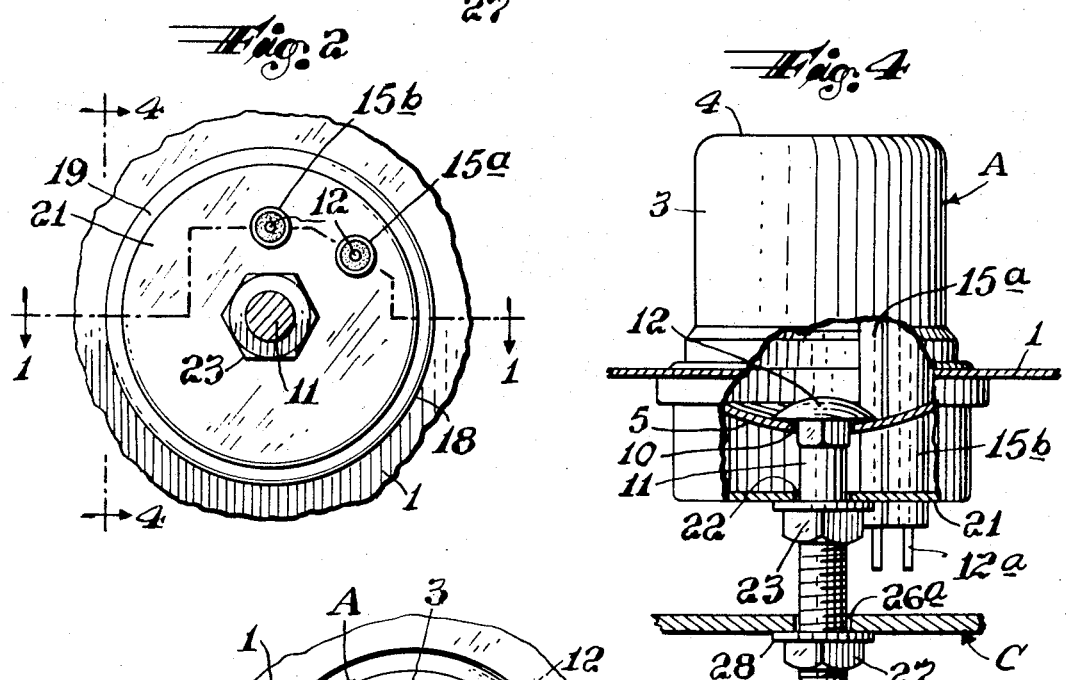
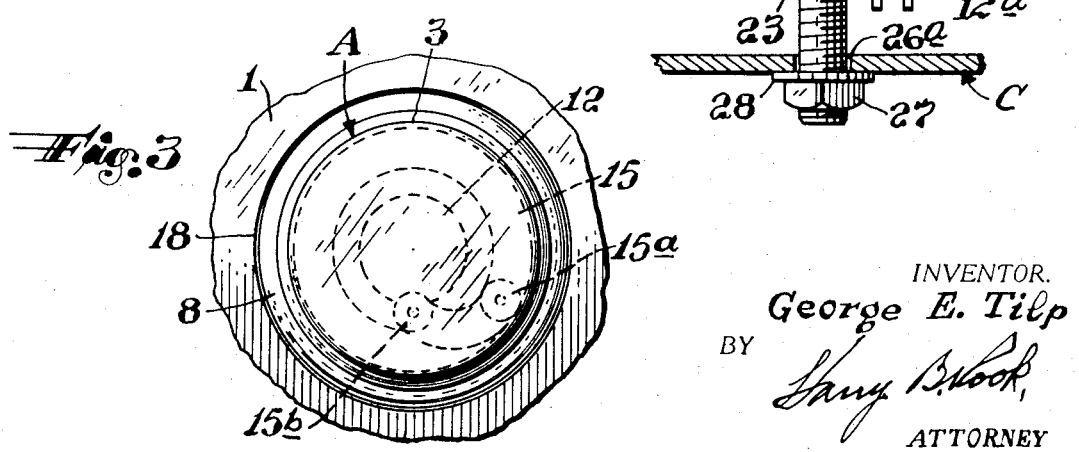
INVENTOR.
George E. Tilp
BY
Harry B. Keck,
ATTORNEY 3,728,517

ELECTRIC HEATER AND MOUNTING THEREFOR

BACKGROUND OF THE INVENTION

1. Field of the Invention

This invention relates to an immersion type electrical heater and means for mounting it in a container, for example, in a coffee percolator.

2. The Prior Art

The prior art includes electric heaters comprising an inverted cup-shaped casing having an electric heater therein including a wire coil on an insulating core, and the lower end of the casing closed by a spring snap-in a plate having a screw threaded stud secured therein for connecting the heater to, for example, the bottom wall of a percolator or other container.

In other assemblies, the lower open end of the casing remains open and a long bolt extends the whole length of the casing and the heater core and has its head fastened to the closed upper end of the casing.

These prior heaters leave much to be desired in that either the snap-in plates may not be reliably held against displacement by the inherent tension in the plate which presses the edge of the plate into an interior groove in the casing and therefore the heater is not reliably held in position in a container, or excessive time is required and difficulty is encountered in assembling the parts, or the heater is too expensive.

SUMMARY OF THE INVENTION

The primary object of the present invention is to provide an electric heater and a mounting therefor which overcomes the objections to or disadvantages of the prior devices and which ensures the heater being firmly held in position in a container, which is inexpensive and the parts of which can be easily and quickly assembled.

Another object is to provide such an electric heater including a self-sustaining coil in an inverted cup-shaped casing whose open end is closed by a cap plate having holes for the ends of said coil and around the edge of which is crimped or die-pressed the rim portion of the casing to firmly secure the plate in the casing, and a bolt passing through a central hole in the plate with the head abutting the inside of the plate and with its shank and nut coacting with a retaining cup to clamp the wall of the container between the cup and a circumferential bead on the exterior of the casing with a liquid-tight joint, thereby to mount the heater in the container.

BRIEF DESCRIPTION OF THE DRAWINGS

FIG. 1 is a vertical sectional view through an electric heater and a portion of a percolator approximately on the plane of the line 1—1 of FIG. 2;

FIG. 2 is a horizontal sectional view approximately on the plane of the line 2—2 of FIG. 1 with portions of the wall of the percolator broken away;

FIG. 3 is a top plan view of the heater on the plane of the line 3—3 of FIG. 1 with portions of the wall of the percolator broken away;

FIG. 4 is a side elevational view of the heater approximately from the plane of the line 4—4 of FIG. 2, showing the heater in upright position and with portions of the heater broken away and shown in section.

DESCRIPTION OF THE PREFERRED EMBODIMENT

Specifically describing the invention, the reference character A designates the heater embodying the invention which for the purpose of illustrating the principles of the invention is shown as mounted in a liquid container in the form of an electric percolator which is shown as comprising a liquid containing a body B and a base C.

The heater is mounted at the bottom wall 1 of the percolator and is firmly held in position by a bolt which also serves to secure the base C to the body B in the manner hereinafter to be described. The heater is shown as comprising an inverted cup-shaped casing formed of, for example, aluminum or stainless steel which has a cylindrically shaped side wall 3, a closed upper end 4 and a cap plate 5 which closes the other end of the casing. The cap is shown as having a concavo-convex central portion and an approximately cylindrical upstanding side wall 6 which has an outturned circumferential flange 7.

The rim portion of the second-mentioned or originally open end of the casing has an outwardly extending circumferential shoulder 8 against which the flange 7 is seated with the concave side of the cap facing upwardly. The cap is rigidly held against the shoulder 8 by the inturned edge 9 of the casing which is rolled, crimped or die-pressed over the flange so that the flange is firmly clamped between the shoulder 8 and the inturned edge 9.

The cap 5 has a central, preferably polygonal, hole 10 to receive loosely the shank 11 of a bolt whose head 12 tiltably abuts the inner or concave side of the cap as best shown in FIG. 4, the bolt, of course, being inserted through said hole before the cap is secured in the casing.

Housed within the casing is an electric heating coil D which comprises a wire 12a enclosed in a steel casing 13 with ceramic insulating material 14 between them, the coil being a special shape and including a helical portion 15 the lower end 15a of which projects through a hole 16 in the cap while the other end 15b extends parallel to the end 15a longitudinally of the coil, and inside the coil and passes through a hole 16a in the cap. Between the coil and the cylindrical wall of the casing is preferably disposed a metal heat distribution cylinder 17. The wire 12a projects beyond the ends of the casing of the coil for connection in an electrical circuit in known manner.

For mounting the heater in the container, the bottom wall 1 of the body of the percolator preferably has an upwardly facing recess 18 the bottom wall 19 of which has an opening through which extends the cylindrical side wall 6 of the cap plate 5, and between said bottom wall 19 of the recess and the circumferential rib on the casing provided by the outturned portion 8 and the inturned portion 9 of the casing wall, is a heat resistant gasket 20.

For drawing and holding the heater casing in liquid tight contact with the gasket, a retaining cup 21 has its edge portion underlying the bottom wall 19 of the recess and has a hole 22 in its bottom wall through which passes the shank of the bolt as best shown in FIG. 4, and a nut 23 on the bolt with a washer between it and the bottom of the retainer cup firmly clamps the retaining cup in position and pulls and holds the circumferential bead of the heater casing in liquid tight contact with the gasket. The bottom wall of the retaining cup has holes 25 and 26 for the respective ends of the heater coil as best shown in FIG. 4.

The base C is firmly connected to the body B by the bolt whose shank extends through an opening 26a in the bottom wall of the base and has a nut 27 thereon with a washer 28 between it and the base so that tightening of the nut 27 draws the body B, through engagement of the bolt head 12 with the cap plate 5, into engagement with the upper edge of the base C.

With this construction, it will be seen that the cap plate is firmly held against displacement from the casing of the heater A, the bolt can be easily slipped through the hole in the cap plate before the cap plate is attached to the casing and the self-sustained steel encased heater coil can be easily placed in the casing with its rigid straight ends projecting through the respective holes in the cap plate before the cap plate is secured in the casing. The invention thus provides for a firm mounting of the heater casing in the container, for a relatively inexpensive construction and for easy and quick assembly of the parts.

I claim:

1. An electric heated adapted to be mounted in a wall of a container and comprising a casing having an approximately cylindrical side wall with one end closed and a cap plate for its other end having a circumferential flange offset from the general plane of the inner side of the plate at its edge, the second-mentioned end of the casing having a rim portion with an outwardly extending circumferential shoulder against which said flange of the cap is seated and rigidly held by the rim portion of said casing pressed inwardly over the flange, said shoulder and said inwardly pressed rim providing an outwardly extending circumferential bead on the casing, a self-sustaining electric heating coil disposed within said casing having its ends projecting in parallel relation to each other and to the axis of the casing, said cap plate having a central hole and a hole for each of said ends of the coil, and a bolt having a shank passing loosely through the first-mentioned hole with a head tiltably abutting the inner side of said cap plate and a nut screw-threaded on said shank at the opposite side of said cap plate from said head.

2. An electric heater as defined in claim 1 wherein said cap plate has a concavo-convex central portion with a cylindrical side wall extending upwardly from the concave side thereof and said circumferential flange extending outwardly from said cylindrical side wall.

3. An electric heater as defined in claim 1 in combination with a wall of said container which has a recess therein with a hole in its bottom wall and wherein said circumferential bead seats on a gasket which is interposed between said wall and said bead, and with the addition of a retaining cup which has its edge abutting the side of said container wall opposite said bead and has a hole in its bottom wall through which passes said bolt shank, and said nut is screwed tightly against said bottom wall of said retaining cup.

4. An electric heater as defined in claim 2 in combination with a wall of said container which has a recess therein with a hole in its bottom wall, and wherein said circumferential bead seats on a gasket which is interposed between said wall and said bead with said cylindrical wall of the cap plate extending through said gasket and said hole in the bottom wall of said recess, and with the addition of a retaining cup which has its edge abutting the side of said container wall opposite said bead and has a hole in its bottom wall through which passes said bolt shank, sand said nut is screwed tightly against said bottom wall of said retaining cup.

* * * * *